Jan. 25, 1955 R. C. LINDLEY 2,700,218
CASTING METHOD FOR USE IN DENTAL RESTORATION
Filed May 21, 1951 2 Sheets-Sheet 1
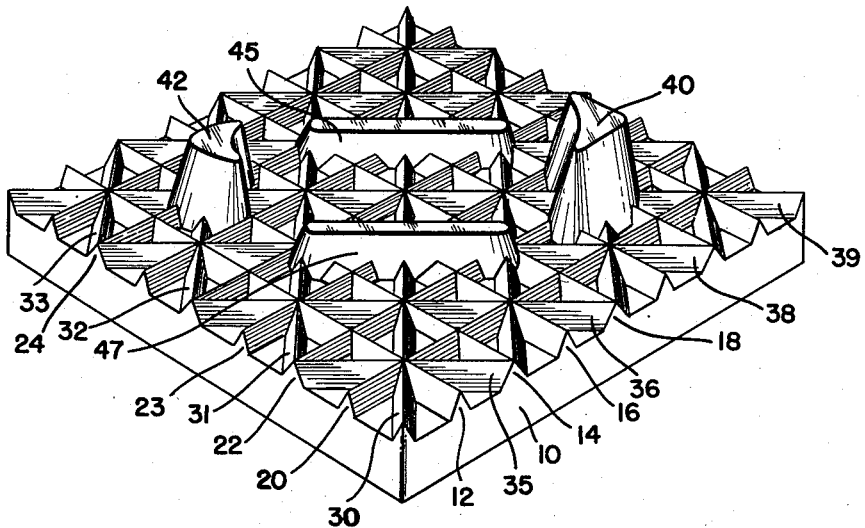
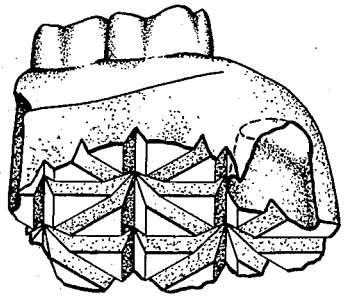
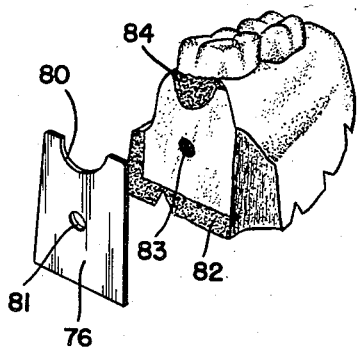
ROSS C. LINDLEY
Inventor Jan. 25, 1955 R. C. LINDLEY 2,700,218
CASTING METHOD FOR USE IN DENTAL RESTORATION
Filed May 21, 1951 2 Sheets-Sheet 2

ROSS C. LINDLEY
Inventor

By Smith & Tuck
Attorneys

United States Patent Office 2,700,218
Patented Jan. 25, 1955

2,700,218

CASTING METHOD FOR USE IN DENTAL RESTORATION

Ross C. Lindley, Seattle, Wash.

Application May 21, 1951, Serial No. 227,418

4 Claims. (Cl. 32—18)

This present invention relates to the art of dentistry and, more particularly, to a match plate or platen upon which casts of teeth are made. This new form of match plate is preferably made of easily cast or molded material which has no affinity for plaster of Paris so that plaster of Paris or other like material may be used to make the cast on the plate without any fear of the same adhering to it. The platen itself is formed with an intricate raised configured surface normally made by forming a large number of repeating patterns, preferably of geometric designs, to the end that a large number of surfaces are provided and which slope upwardly to the top of the plate so that the cast can be easily removed from the plate and be again repositioned on the plate in the exact arrangement it formerly assumed. The use of this new platen makes it possible to employ a modification of the normal dental technique which greatly reduces the time of the operator and further assures the high degree of accuracy that must be maintained for good work.

In the past when a dentist undertook to create a set of artificial teeth, attachments for teeth, or dentures for his patients, it was common to make full upper and lower casts of the dental arches. These were then reproduced with a considerable mass of material made at the same time and of the same material as the cast, normally plaster of Paris. These reconstructions of the patient's mouth are essential in the making of restorations of teeth, whether they be inlays, crowns, full plates or partial plates or bridge work they must be very accurately made and require so much time and technique it would be very tiring to do much of the work in the patient's mouth, consequently the reproduction of the patient's mouth is necessary. The general shortcoming of this procedure resided in the fact that a large mass of material had to be handled and it was not convenient to separate the teeth for more ease of application of the work thereto because of the difficulty of preserving the accurate form if the large cast was broken into smaller parts.

In this present invention it is believed a new technique has been provided and the method that has been developed makes full use possible of the newer plastic materials and appreciably shortens the time required by the skilled operator. It makes his work more easily divided into convenient segments so that abutments and the like can be very conveniently and accurately made without losing in any degree the accuracy or location in the dental arch, such work requires.

The principal object of this invention therefore is to provide a method and means for using the newer plastic impression materials and thus reduce the time of an operator in making dental prosthesis.

A further object is to provide a match plate to assist in placing indirect inlay, crown and brige impressions on models in the proper location of the dental arch so the marginal ridges, contact and occlusion can be duplicated out of the patient's mouth.

A further object of this invention is to provide a dental platen having on its working face a plurality of re-occurring patterns, each provided with a plurality of inclined faces meeting each other at various angles.

A further object of this invention is to provide on a configured platen face, a plurality of locating bosses.

A further object of this present invention is to provide a platen on which a dental cast can be made using the minimum amount of plaster to the end that the cast can be separated into a plurality of small pieces and removed from the platen with the assurance that they can again be replaced on the platen in the exact original position due to the configuration of the same.

A further object of this present invention is to provide convenient means for separating a cast made on the configured platen face.

Further objects, advantages and capabilities will be apparent from the description and disclosure in the drawings, or may be comprehended or are inherent in the device.

In the drawings:

Figure 1 is a perspective view showing the upper or working face of my dental platen;

Figure 2 is a perspective view showing in exploded relationship a portion of a dental cast and the partition plates employed to create convenient separations of the same;

Figure 3 is a perspective view showing a portion of a dental cast and showing the configuration produced on the under side of a cast through the use of my configured dental platen;

Figure 7:
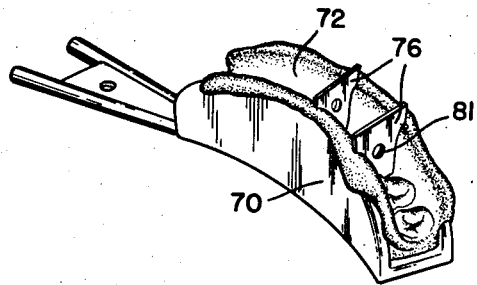
Figure 7 is a perspective view showing the hydrocolloid impression removed from the patient's teeth.

Referring more particularly to the disclosure in the drawings, the numeral 10 designates the base portion of my platen. This portion should be thick enough so as to insure that the platen will not be distorted in handling; the actual thickness of course varying to a degree with the materials used in constructing it. A preferred material, at this time, is plastic material of the thermosetting type. In this, after the molding is made and cured under heat and pressure, the material is brittle to the degree that if dropped or otherwise roughly handled it is more apt to break than bend. This construction may be likened somewhat to a platen or surface plate used in machine operations in that if distortion occurs the whole product is valueless; therefore it is to be preferred that the platen actually breaks or shatters and will then be discarded whereas a unit that would bend permanently out of a true plane might be used without the operator's knowledge and defective work thus be produced.

In order that casts can be removed from the platen, in part or as a whole, and then accurately repositioned on the platen, it is desirable that the upper surface be configured in a re-occuring pattern. One such pattern is illustrated throughout the drawings and consists first, of a grid composed of V-shaped ridges 12, 14, 16, 18, etc. and a second grid which intersects the first grid at right angles and is shown in the drawings by ridges 20, 22, 23 and 24 and the like. Inasmuch as there are times when relatively small elements are taken off the platen it is desirable to have other angularly disposed grid ridges and it is therefore desirable to provide ridges intersecting the first grids at an angle of 45 degrees. These are shown by a plurality of parallel ridges as 30, 31, 32, 33 and a further set of grids formed of the parallel ridges 35, 36, 38 and 39 intersecting the third set of ridges at right angles.

It has been found in use that if the cast is taken off the platen it is normally difficult to relocate the same due to the fact that the apices of the various ridges lie quite close to each other and form a common plane. It has therefore been found that in order to save the operator's time it is desirable to provide a plurality of locating bosses. These are illustrated in Figure 1 where a relatively large boss 40 is provided which stands considerably above the plane of the V ridges and spaced well apart from this boss is a second locating boss 42. These two bosses should have a different outline in cross-section so that in replacing a cast on the platen it will only fit in one location and that location can be determined quickly. It has further been found that in some instances it is desirable to have still additional bosses on the platen face and these are illustrated as lateral bosses 45 and 47 which again stand above the plane of the V ridges. One form of arrangement of these various bosses is illustrated in Figure 1. This arrangement however can be modified for most convenient use with the size cast to be made.

Figure 4:
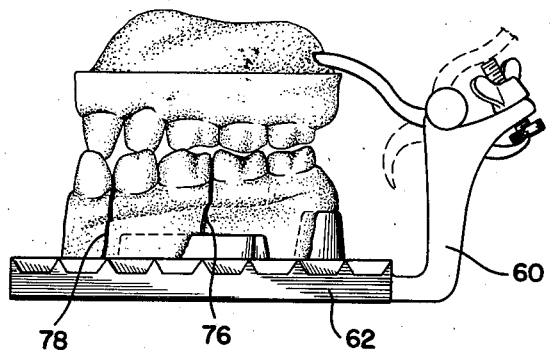
Figure 4 illustrates the employment of the principles of this invention in a typical dental articulator.
Figure 5:
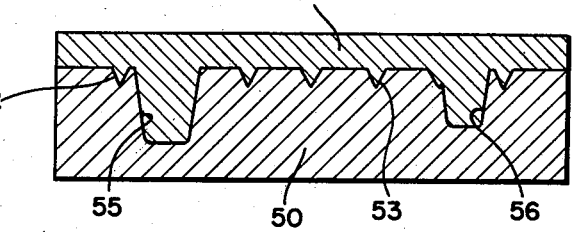
Figure 5 is a vertical cross-sectional view through my platen and the master from which the platen is made.

A satisfactory master mold for platens of this order is shown, in section, in Figure 5. This consists of, preferably, a relatively heavy steel die member 50 into which are machined grooves which in turn form the V ridges previously described. These grooves 52, 53, and the like are easily machined in the steel and because of the reversal of the pattern no problem is experienced in making these various intersections between the four grids as described in the construction shown in Figure 1. Likewise the locating bosses are formed by suitable depressions as 55 and 56 formed in plate 50. When the die is finished in accordance with the technique developed for different types of molding, platens can then be made in quantity from any suitable material. In addition to the plastic materials, suitable platens can be made from some of the relatively low melting metal alloys which set as brittle or hard castings. Various alloys employing principally the white metals such as magnesium, aluminum, tin, zinc, antimony and the like can be employed for this purpose. The metal platens are at times found most desirable for use with articulators, of which the form shown at 60 in Figure 4 is a representative construction. Here the platen 62 can be formed either as part of the articulator or constructed so that it may be attached fixedly thereto.

Figure 8:
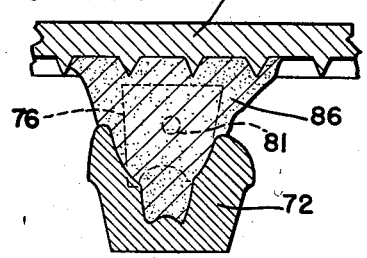
Figures 6, 8 and 9 are vertical cross-sectional views showing successive steps in the production of a dental cast following the teachings of the method disclosed.
Figure 9:
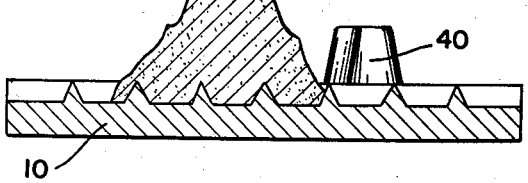
Figure 6:
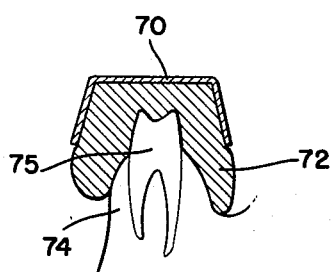

In Figures 8 and 9 I have illustrated a desirable method of employing my platen. Figure 6 illustrates making an impression of the teeth and gums of the patient's mouth using the usual impression tray 70 and a suitable plastic material 72. Figure 7 further illustrates this operation. This gives a proper impression of the gums 74 and the teeth under reconstruction as 75. The impression thus obtained is used after the fashion of Figure 8 in which a batter of plaster of Paris, usually, is flowed into the impression and then the platen 10 is employed to form a base for the cast.

The plaster of Paris or other suitable material is allowed to flow out to form a base on platen 10 and should come into firm engagement with two or more of either locating bosses or the lateral bosses; a preferred arrangement being either the two locating bosses or one lateral boss and a locating boss, or some such combination which will insure that the operator can quickly reposition the cast on the platen when he so desires. It has been found quite convenient to provide definite cleavage lines in the cast so that it can be broken down into smaller units for better study and application of working tools. This is easily achieved with my platen by providing the separating plates as 76, 78 and the like which are positioned within the matrix 72 prior to making the plaster cast. The preferred emplacement is shown in Figure 8 where it is to be noted that the separators are prevented from going clear to the bottom of the cast by the various V ridges so that a portion of the cast must be broken at that point. Likewise it has been found desirable to relieve the upper portion of the separator as at 80 and to provide openings 81 so that again portions of the cast must actually be fractured. These fractures are probably best illustrated in Figure 2 at 82, 83 and 84. When the matrix is removed the platen is turned right side up as shown in Figure 9 and the cast 86 is now available to the operator for any studies and to form the basis of wax modeling or the construction of abutments as for bridges or for any other use necessary in dental prosthetics.

In Figure 7 the matrix 72 in tray 70 is shown just after it is removed from the teeth. At this stage the impression material, preferably a plastic as hydrocolloid is still soft enough to permit seating separators 76 in place in the exact positions required.

It is believed that it will be clearly apparent from the above description and the disclosure in the drawings that the invention comprehends a novel casting method for use in dental restoration.

Having thus described my invention, I claim:

1. A method in the field of dentistry including the steps of taking an impression of a group of a patient's teeth, applying fresh plaster upon the mounting bed of a platen having an embossed mounting bed thereon in which the embossing characters are closely associated and so formed as to permit a ready draw and pressing said impression upon the exposed potrion of the plaster so as to fill the cavity of the impression and produce from said plaster a cast of the impressed group of teeth having its base imprinted with the embossing characters of the platen, allowing the plaster to set and then freeing the same from the impression and from the platen, the cast thereby being adapted to be divided into sections as desired and thereafter exactly reassembled on the mounting bed of the platen by mating the embossing characters and their respective imprints.

2. A method in the field of dentistry, including the steps of taking an impression of a group of a patient's teeth, positioning thin separators within the cavity of the said impression such that said separators are localized with respect thereto, applying fresh plaster upon the mounting bed of a platen having an embossed mounting bed thereon in which the embossing characters are closely associated and so formed as to permit a ready draw and pressing the impression upon the exposed portion of the plaster so as to fill the said cavity and thereby produce from said plaster a cast of the impressed group of teeth having the separators substantially embedded therein and having its base imprinted with the embossing characters of the platen, allowing the plaster cast to set and then freeing the same from the impression and from the platen, and dividing the freed cast into sections along the faces of the embedded separators, the said sections being thereby adapted to be exactly reassembled on the mounting bed of the platen by mating the embossing characters and their respective imprints.

3. A method in the field of dentistry, including the steps of taking an impression of a group of a patient's teeth, positioning apertured thin separators within the cavity of the said impression such that said separators are localized with respect thereto, applying fresh plaster upon the mounting bed of a platen having an embossed mounting bed thereon in which the embossing characters are closely associated and so formed as to permit a ready draw and pressing the impression upon the exposed portion of the plaster so as to fill the said cavity and the apertures in the separators and thereby produce from said plaster a cast of the impressed group of teeth having the separators substantially embedded therein and having its base imprinted with the embossing characters of the platen, allowing the plaster cast to set and then freeing the same from the impression and from the platen, and dividing the freed cast into sections along the faces of the embedded separators, the said sections being thereby adapted to be exactly reassembled on the mounting bed of the platen by mating the embossing characters and their respective imprints.

4. A method in the field of dentistry including the steps of making a plaster cast of a portion of a dental arch with a thin separator embedded in the cast and with the base of the cast imprinted with a correlating pattern identical with the pattern formed by the embossing characters of an embossed mounting bed, and dividing said cast into sections along the faces of the embedded separator, said sections being thereby adapted to be exactly reassembled on said mounting bed by mating the imprints in the base of said cast and their respective embossing characters.

References Cited in the file of this patent

UNITED STATES PATENTS

| Number | Name | Date |
|---|---|---|
| 1,583,928 | Hollander et al. | May 11, 1926 |
| 1,813,583 | Rice | July 7, 1931 |
| 2,011,860 | Kalvin | Aug. 20, 1935 |
| 2,171,759 | Meyer | Sept. 5, 1939 |
| 2,376,384 | Ringle | May 22, 1945 |
| 2,456,447 | Ringle | Dec. 14, 1948 |
| 2,487,143 | Kern | Nov. 8, 1949 |
| 2,619,725 | Roeser | Dec. 2, 1952 |

FOREIGN PATENTS

| 328,571 | Great Britain | of 1929 |